(12) United States Patent
Malet

(10) Patent No.: US 8,889,822 B2
(45) Date of Patent: Nov. 18, 2014

(54) COPOLYMERS COMPRISING POLYAMIDE BLOCKS AND POLYETHER BLOCKS AND HAVING IMPROVED MECHANICAL PROPERTIES

(71) Applicant: Arkema France, Colombes cedex (FR)

(72) Inventor: Frederic Malet, Rouen (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/859,380

(22) Filed: Apr. 9, 2013

(65) Prior Publication Data

US 2013/0296502 A1    Nov. 7, 2013

Related U.S. Application Data

(60) Continuation of application No. 13/300,939, filed on Nov. 21, 2011, now abandoned, which is a division of application No. 12/279,569, filed as application No. PCT/FR2007/050813 on Feb. 16, 2007.

(60) Provisional application No. 60/784,350, filed on Mar. 21, 2006.

(30) Foreign Application Priority Data

Feb. 16, 2006    (FR) ..................................... 06 01355

(51) Int. Cl.
- *C08G 69/26* (2006.01)
- *C08G 81/00* (2006.01)
- *C08G 69/40* (2006.01)

(52) U.S. Cl.
CPC .............. *C08G 81/00* (2013.01); *C08G 69/40* (2013.01)
USPC ........... 528/335; 528/272; 528/324; 528/325; 528/332; 525/434

(58) Field of Classification Search
CPC ................................ C08G 81/00; C08G 69/40
USPC ......... 528/271, 272, 288, 292, 301, 310, 315, 528/322, 323, 324, 325, 328, 329.1, 332, 528/335, 338, 339, 340, 367, 369, 300; 428/38, 43, 77, 98, 221, 334, 335, 357, 428/364, 394, 395, 474.4, 480; 525/411, 525/419, 420, 420.5, 926, 927, 92, 434
See application file for complete search history.

(56) References Cited

U.S. PATENT DOCUMENTS

| | | |
|---|---|---|
| 4,230,838 A | 10/1980 | Foy et al. |
| 4,331,786 A | 5/1982 | Foy et al. |
| 4,332,920 A | 6/1982 | Foy et al. |
| 4,820,796 A | 4/1989 | Suzuki et al. |
| 6,590,065 B1 | 7/2003 | Goldfinger |
| 2002/0018866 A1 | 2/2002 | Lee et al. |
| 2005/0165210 A1 | 7/2005 | Malet et al. |

FOREIGN PATENT DOCUMENTS

WO    WO 2007/093750    8/2007

*Primary Examiner* — Frances Tischler
(74) *Attorney, Agent, or Firm* — RatnerPrestia

(57) ABSTRACT

The invention relates to a process for producing a shaped article having excellent mechanical properties, said article comprising a block copolymer PAX.Y/PE comprising polyamide (PA) blocks alternating with polyether (PE) blocks, prepared from homopolyamide blocks PAX.Y by polycondenstation of linear aliphatic diamines where PAX.Y is selected from the group consisting of PA 10,12; PA 6,18; PA 10,14; and PA 12.12, reacted with polyether PE blocks in the presence of a catalyst to produce a block copolymer PAX.Y/PE, wherein said PE blocks are either PE diols, or PE blocks comprising $NH_2$ ends. The articles formed are either a fabric, film, sheet, rod, pipe, injection-molded component, or a shoe sole; the copolymer PAX.Y/PE has an improved flexural modulus of at least 300 MPa greater than a copolymer polyamide 12/polytetrametylene with the same size of PA block and with the same size of PE block respectively.

8 Claims, No Drawings

COPOLYMERS COMPRISING POLYAMIDE BLOCKS AND POLYETHER BLOCKS AND HAVING IMPROVED MECHANICAL PROPERTIES

REFERENCE TO RELATED APPLICATIONS

This application is a continuation of U.S. application Ser. No. 13/300,939 filed on Nov. 21, 2011, and now abandoned, which is a divisional application of U.S. application Ser. No. 12/279,569, filed Aug. 15, 2008; and now abandoned; which is a 35 USC §371 filing of PCT/FR07/50813 filed Feb. 16, 2007, and claiming priority to U.S. application No. 60/784,350 filed Mar. 21, 2006, and also claiming priority to FR 6.01355 filed Feb. 16, 2006. This application claims priority to each of these applications.

FIELD OF THE INVENTION

The present invention relates to novel copolymers comprising polyamide blocks (abbreviated to PA block) and polyether blocks (abbreviated to PE block) having improved optical and/or mechanical properties. Such block copolymers are also known as polyether-block-amides (abbreviation PEBA).

The PEBA copolymers of the invention belong to the specific category of the polyetheresteramides when they result from the copolycondensation of polyamide blocks comprising reactive carboxyl ends with polyether blocks comprising reactive ends which are polyether polyols (polyether diols), the bonds between the polyamide blocks and the polyether blocks being ester bonds, or also to the category of the polyetheramides when the polyether blocks comprise amine ends.

BACKGROUND OF THE INVENTION

The document EP 1 500 684 reports antistatic elastomeric compositions comprising a PEBA copolymer comprising PE blocks essentially made of PEG and PAX.Y blocks with X an aliphatic diamine, such as, for example, hexamethylenediamine and $C_9$ to $C_{25}$ diamines, and Y a $C_9$ to $C_{25}$ aliphatic diacid. These copolymers possessing antistatic properties do not come within the scope of our invention and are, of course, excluded as such.

The document EP 1 262 527 relates to an antistatic polymer composition comprising a PEBA of PAX.Y type with, as aliphatic diamine X: hexamethylenediamine, dodecamethylenediamine and trimethylhexamethylenediamine, and, as aliphatic diacid Y: butanoic acid, adipic acid, azelaic acid, suberic acid, sebacic acid, dodecanedicarboxylic acid, dimerized fatty acids and polyoxyalkylene-α,ω-diacids. The PE blocks made of PEG, which confer the antistatic properties on the copolymer and on the composition, can be used with PPG blocks, indeed even with PTMG blocks. These copolymers do not come within the scope of our invention and are, of course, excluded as such.

The document WO 03/050159 discloses PEBAs with, as hard segment, a PAX.Y block with X a linear aliphatic diamine comprising 4-14 carbon atoms and Y a linear aliphatic diacid comprising from 4 to 14 carbon atoms and with, as soft segment, PO3G, it being possible for the latter to comprise up to 60% by weight of another polyether, such as PEG, PPG and PTMG. These copolymers do not come within the scope of our invention and are, of course, excluded as such.

The document WO 04/037898 has as subject matter a copolymer comprising PA blocks and PE blocks, the PA blocks of which are copolyamides which can be of the PAX1.Y1/X2.Y2 or PAX1.Y1/Z type, X1 and X2 being diamines, Y1 and Y2 being diacids and Z being a lactam or an amino acid. These copolymers do not come within the scope of our invention and are, of course, excluded as such.

The Applicant Company has discovered, surprisingly, a novel category of PEBAs exhibiting improved optical properties, in particular a reduction in the opaqueness of the PEBAs, and/or improved mechanical properties, in particular a very good dynamic fatigue resistance.

SUMMARY OF THE INVENTION

The subject matter of the present invention is thus, in the context of improved optical properties, a copolymer PAX.Y/PE comprising polyamide PA blocks alternating with polyether PE blocks, the PA blocks being composed of homopolyamide PAX.Y blocks obtained by polycondensation:
  of a linear aliphatic diamine having X carbon atoms;
  of a dicarboxylic acid having Y carbon atoms;
said copolymer being characterized in that:
  said PA blocks comprise carboxyl ends;
  X is at least equal to 4, preferably at least equal to 6;
  Y is at least equal to 10, preferably at least equal to 12;
  said PE blocks:
    (i) preferably, are either PE blocks comprising hydroxyl ends, otherwise known as PE diol blocks, so that the bonds between the PA blocks comprising carboxyl ends and the PE diol blocks are ester bonds;
    (ii) preferably, or are PE blocks comprising $NH_2$ ends in the case where Y has a number of carbon atoms of greater than 14, so that the bonds between the PA blocks comprising carboxyl ends and the PE blocks comprising $NH_2$ ends are amide bonds;
    (iii) comprise from 0 to 39% by weight of PO3G and/or PEG and from 100 to 61% by weight of polyether other than PO3G or PEG (% by weight, expressed with respect to the total weight of the copolymer);
characterized in that the copolymer PAX.Y/PE has improved optical transmission properties at 460 nm, at 560 nm and at 700 nm in comparison with a copolymer PA12/PTMG (iv) with the same size of PA block and with the same size of PE block respectively and/or (v) with the same stiffness, defined either by a flexural modulus (in MPa) or by a tensile modulus (in MPa) or by a Shore D hardness.

According to one embodiment, the copolymer is characterized in that the 100 to 61% of polyether in (iii) are chosen from PTMG, PPG, their blends and their copolymers.

According to one embodiment, the copolymer is characterized in that X+Y≥22, preferably≥24 and is advantageously equal to 22, 24, 26, 28 or 30.

According to one embodiment, the copolymer is characterized in that the PA block is chosen from a PA10.12, PA6.18, PA10.14, PA12.12, PA12.14, PA10.18 and PA12.18 block.

DETAILED DESCRIPTION OF THE INVENTION

The subject matter of the present invention is thus, in the context of improved mechanical properties, a copolymer PAX.Y/PE comprising polyamide PA blocks alternating with polyether PE blocks, the PA blocks being composed of homopolyamide PAX.Y blocks obtained by polycondensation:
  of a linear aliphatic diamine having X carbon atoms;
  of a dicarboxylic acid having Y carbon atoms; and said copolymer being characterized in that:
said PA blocks comprise carboxyl ends;
X is at least equal to 4, preferably at least equal to 6;
Y is at least equal to 10, preferably at least equal to 12;
said PE blocks:
(iv) preferably, are either PE blocks comprising hydroxyl ends, otherwise known as PE diol blocks, so that the bonds between the PA blocks comprising carboxyl ends and the PE diol blocks are ester bonds;
(v) preferably, or are PE blocks comprising $NH_2$ ends in the case where Y has a number of carbon atoms of greater than 14, so that the bonds between the PA blocks comprising carboxyl ends and the PE blocks comprising $NH_2$ ends are amide bonds;
(vi) comprise from 0 to 39% by weight of PO3G and/or PEG and from 100 to 61% by weight of polyether other than PO3G or PEG (% by weight, expressed with respect to the total weight of the copolymer);
characterized in that (iv) the crystallinity of the PAX.Y block is >the crystallinity of a PA12 block of the same size and/or (v) the PA/PE phase separation of said copolymer PAX.Y/PE is >that of a copolymer PA12/PTMG composed of PA12 blocks of the same size as the PAX.Y blocks of said copolymer PAX.Y/PE and of PTMG blocks of the same size as the PE blocks of the PAX.Y/PE copolymer.

According to a specific embodiment, the copolymer is characterized in that X+Y≤24, preferably equal to 24 or to 22 or to 20.

According to one embodiment, the copolymer is characterized in that the PA block is chosen from a PA10.14, PA12.12, PA6.18, PA10.12, PA6.14 and PA10.10 block.

According to one embodiment, the copolymer is characterized, in the context of the improved mechanical properties and/or improved optical properties:
in that the dicarboxylic acid having Y carbon atoms is chosen from linear aliphatic diacids;
in that Y is between 10 and 20, advantageously between 12 and 20, preferably between 10 and 18, more preferably still between 12 and 18, limits included. Thus, mention may be made, as dicarboxylic acids having Y carbon atoms, of sebacic acid, dodecanedicarboxylic acid or octadecanedicarboxylic acid;
in that X is between 6 and 20, limits included, preferably between 6 and 14, limits included. Thus, mention may be made, as linear aliphatic diamines having X carbon atoms, of tetramethylenediamine, hexamethylenediamine and 1,10-decamethylendiamine.

The polyamide block PAX.Y, depending on its properties, is advantageously chosen from polyamide 4.12, polyamide 4.14, polyamide 4.18, polyamide 6.10, polyamide 6.12, polyamide 6.14, polyamide 6.18, polyamide 9.12, polyamide 10.10, polyamide 10.12, polyamide 10.14 and polyamide 10.18 blocks. In a more particularly preferred way, the polyamide block PAX.Y is a PA6.18 or PA10.14 block for the improved optical properties and a PA6.12 or PA6.14 block for the improved mechanical properties.

PA6.12/PTMG can be excluded from the scope of our invention.

The polyamides PAX.Y below result from the condensation of the diamine X and the diacid Y, such as:
PA4.12: 1,4-tetramethylenediamine and 1,10-decanedicarboxylic acid.
PA4.14: 1,4-tetramethylenediamine and 1,12-dodecanedicarboxylic acid.
PA4.18: 1,4-tetramethylenediamine and 1,16-hexadecanedicarboxylic acid.
PA6.10: hexamethylenediamine and sebacic acid.
PA6.12: hexamethylenediamine and 1,10-decanedicarboxylic acid.
PA6.14: hexamethylenediamine and 1,12-dodecanedicarboxylic acid.
PA6.18: hexamethylenediamine and 1,16-hexadecanedicarboxylic acid.
PA9.12: 1,9-nonanediamine and 1,10-decanedicarboxylic acid.
PA10.10: 1,10-decamethylenediamine and sebacic acid.
PA10.12: 1,10-decamethylenediamine and 1,10-decanedicarboxylic acid.
PA10.14: 1,10-decamethylenediamine and 1,12-dodecanedicarboxylic acid.
PA10.18; 1,10-decamethylenediamine and 1,16-hexadecanedicarboxylic acid.

The polyether blocks of the PEBA copolymer of the invention advantageously result from at least one polyalkylene ether polyol, in particular a polyalkylene ether diol more particularly chosen from polypropylene glycol (PPG), polytetramethylene glycol (PTMG), their blends and their copolymers. Preferably, PTMG will be chosen.

For Y>14, the PE blocks can comprise a blend of PE blocks or be a polyether copolymer. In this case, they comprise 0-39% by weight of PO3G and/or PEG and 100-61% by weight of polyether(s) other than PO3G or PEG (weight with respect to the weight of the PE blocks).

The PE blocks are never predominantly of PEG and never comprise more than 39% by weight of PO3G (weight with respect to the weight of the PE blocks).

The polyether blocks of the PEBA copolymer according to the present invention can also be polyoxyalkylene blocks comprising $NH_2$ chain ends, it being possible for such blocks to be obtained by cyanoacetylation of aliphatic polyoxyalkylene-α,ω-dihydroxyl blocks, also known as polyether diols. More particularly, use may be made of Jeffamines (for example Jeffamine® D400, D2000, ED 2003 and XTJ 542, products sold by Huntsman. See also patents JP 2004346274, JP 2004352794 and EP 1 482 011).

The number-average molecular weight of a copolymer according to the present invention is advantageously between 5000 and 50 000, preferably between 10 000 and 30 000.

The number-average molecular weight of the PA blocks is advantageously between 500 and 10 000, preferably between 600 and 7000, more advantageously still between 1500 and 6000.

The number-average molecular weight of the PE blocks is advantageously between 250 and 5000, preferably between 250 and 2000, more advantageously still between 350 and 1000.

The PA blocks advantageously represent between 5 and 95% by weight, preferably between 10 and 95% by weight, of the sum of the PA blocks and PE blocks of the copolymer of the present invention.

Another subject matter of the invention is a process for the preparation of a copolymer as defined above, in several stages, characterized in that:
in a first stage, the polyamide PA blocks are prepared by polycondensation
of the linear aliphatic diamine having X carbon atoms;
of the dicarboxylic acid having Y carbon atoms; and
in the presence of a chain-limiting agent chosen from dicarboxylic acids; then
in a second stage, the polyamide PA blocks obtained are reacted with polyether PE blocks in the presence of a catalyst.

The general method for the preparation in two stages of the PEBA copolymers of the invention having ester bonds between the PA blocks and the PE blocks is known and is described, for example, in French patent FR 2 846 332. The general method for the preparation of the PEBA copolymers of the invention having amide bonds between the PA blocks and the PE blocks is known and described, for example, in European patent EP 1 482 011.

The reaction for the formation of the PA block is usually carried out between 180 and 300° C., preferably from 200 to 290° C., the pressure in the reactor becomes established between 5 and 30 bar and is maintained for approximately 2 to 3 hours. The pressure is slowly reduced by placing the reactor at atmospheric pressure and then the excess water is distilled off, for example over one or two hours.

The polyamide comprising carboxylic acid ends having been prepared, the polyether and a catalyst are subsequently added. The polyether can be added on one or more occasions, and likewise for the catalyst. According to an advantageous form, the polyether is first added and the reaction of the OH ends of the polyether and of the COOH ends of the polyamide begins with the formation of ester bonds and elimination of water. As much as possible of the water is removed from the reaction medium by distillation and then the catalyst is introduced in order to complete the bonding of the polyamide blocks and polyether blocks. This second stage is carried out with stirring, preferably under a vacuum of at least 6 mmHg (800 Pa), at a temperature such that the reactants and the copolymers obtained are in the molten state. By way of example, this temperature can be between 100 and 400° C. and generally 200 and 300° C. The reaction is monitored by measuring the torque exhibited by the molten polymer on the stirrer or by measuring the electric power consumed by the stirrer. The end of the reaction is determined by the value of the target torque or of the target power.

The invention also relates to a process for the preparation of a copolymer as defined above, characterized in that a single-stage polycondensation is carried out:
- of the linear aliphatic diamine having X carbon atoms;
- in the presence of a chain-limiting agent chosen from dicarboxylic acids;
- in the presence of polyether PE blocks; and
- in the presence of a catalyst for the reaction between the PE blocks and the PA blocks.

Whatever the process for the manufacture of the copolymer, in a single stage or in several stages:
- the process is characterized in that it is possible to use, as chain-limiting agent, the dicarboxylic acid having Y carbon atoms, which is introduced in excess with respect to the stoichiometry of the diamine;
- the process is characterized in that it is possible to use, as catalyst, a derivative of a metal chosen from the group formed by titanium, zirconium and hafnium or a strong acid, such as phosphoric acid or boric acid;
- the process is characterized in that it is possible to carry out the polycondensation at a temperature from 180 to 300° C.;
- the catalyst is defined as being any product which makes it possible to facilitate the bonding of the polyamide blocks and the polyether blocks by esterification or by amidation. The esterification catalyst is advantageously a derivative of a metal chosen from the group formed by titanium, zirconium and hafnium or also a strong acid, such as phosphoric acid or boric acid.

Examples of catalysts are those described in patents U.S. Pat. No. 4,331,786, 4,115,475, 4,195,015, 4,839,441, 4,864,014, 4,230,838, and U.S. Pat. No. 4,332,920.

It is also possible to add, during the synthesis, at the moment judged the most opportune, one or more molecules used as antioxidant, for example Irganox® 1010 or Irganox® 245.

Another subject matter of the present invention is a shaped article which can advantageously be transparent or translucid, such as, for example, fiber, fabric, film, sheet, rod, pipe or any injection-molded component (components of shoe soles, and the like), comprising the copolymers as defined above.

The invention furthermore relates to the use of a copolymer PAX.Y/PE mentioned above in manufacturing an item, the optical properties of which are improved in comparison with the same item manufactured with a copolymer PA12/PTMG comprising PA blocks made of PA12 and comprising PE blocks made of PTMG, it being known that:
- the size of the PA blocks of said copolymers PAX.Y/PE and PA12/PTMG is the same or substantially the same and the size of the PE blocks of said copolymers PAX.Y/PE and PA12/PTMG is the same or substantially the same; and/or
- the stiffness of said copolymers PAX.Y/PE and PA12/PTMG is the same or substantially the same, said stiffness being defined either by a flexural modulus (in MPa) or by a tensile modulus (in MPa) or by a Shore D hardness.

"Substantially" means that the value either of the flexural modulus (in MPa) or of the tensile modulus (in MPa) or of the Shore D hardness of the copolymer PAX.Y/PE according to the invention is greater or lower by at most 20%, preferably by at most 10%, advantageously by at most 5%, than the value either of the flexural modulus (in MPa) or of the tensile modulus (in MPa) or of the Shore D hardness respectively of the copolymer PA12/PTMG.

The invention also relates to the use of a copolymer PAX.Y/PE mentioned above in manufacturing an item, the mechanical properties of which are improved in comparison with the same item manufactured with a copolymer comprising PA blocks made of PA12 and comprising PE blocks made of PTMG, it being known that:
- the size of the PA blocks of said copolymers PAX.Y/PE and PA12/PTMG is the same or substantially the same and the size of the PE blocks of said copolymers PAX.Y/PE and PA12/PTMG is the same or substantially the same; and/or
- the crystallinity of the PAX.Y block is >the crystallinity of a PA12 block of the same size and/or the PA/PE phase separation of said copolymer PAX.Y/PE is >that of a copolymer PA12/PTMG composed of PA12 blocks of the same size as the PAX.Y blocks of said copolymer PAX.Y/PE and of PTMG blocks of the same size as the PE blocks of the copolymer PAX.Y/PE.

EXAMPLES

The following examples illustrate the present invention without, however, limiting the scope thereof.

Example 1

Preparation of copolymer comprising polyamide 6.18 Blocks and comprising blocks resulting from polytetramethylene ether glycol: abbreviated to PA6.18-PTMG A PEBA was prepared from PA6.18 blocks with a molar mass of 2000 g/mol and from PTMG blocks with a molar mass of 1000 g/mol according to the following procedure:

The following monomers are introduced into an autoclave equipped with a stirrer so as to obtain PA6.18 blocks: 5 kg of hexamethylenediamine and 16.9 kg of octadecanedioic acid. The mixture thus formed is placed under an inert atmosphere and heated until the temperature reaches 250° C. and a pressure of 32 bar. After maintaining for 1 h, a pressure-reducing operation lasting 1 h is subsequently carried out in order to return to atmospheric pressure.

Polytetramethylene glycol with a mass of 1000 g/mol (10.22 kg) and $Zr(OBu)_4$ (30 g) are subsequently added to the reactor in order to complete the polymerization at 240° C. under an absolute pressure of 8 mbar (i.e., 800 Pa).

The final product PA6.18-PTMG has an intrinsic viscosity of 1.4 dl/g.

The injection molding of 100*100*2 mm sheets confirms the improved optical properties of the product with a transmission at 460 nm of 59%, at 560 nm of 74% and at 700 nm of 82%, an opaqueness of approximately 20% and a haze of 11, which can be compared with values obtained for a copolymer with the same block size but based on PA12 and PE=PTMG, respectively 29, 43, 58, 26 and 30.

Example 2

Preparation of copolymer comprising polyamide 10.14 blocks and comprising blocks resulting from polytetramethylene ether glycol: abbreviated to PA10.14-PTMG A PEBA was prepared from PA10.14 blocks with a molar mass of 5000 g/mol and from PTMG blocks with a molar mass of 650 g/mol according to the preceding procedure with, however, as diamine, 1,10-decamethylenediamine (11.95 kg), as diacid, 1,12-dodecanedicarboxylic acid (19.4 kg), and polytetramethylene glycol (3.7 kg). The final product PA10.14-PTMG has an intrinsic viscosity of 1.28 dl/g.

The injection molding of 100*100*2 mm sheets confirms the improved optical properties of the product with a transmission at 460 nm of 49.5%, at 560 nm of 62.9% and at 700 nm of 71.7% (measurements carried out according to ASTM D 1003), an opaqueness of approximately 20% (measurement carried out according to ASTM D 1003) and a haze of 11 (measurement carried out according to ISO 2814), which can be compared with the values obtained for a copolymer with the same size of PA blocks and with the same size of PE blocks respectively but based on PA12 and PTMG, the said values respectively being 14, 23, 35, not measured and 25.

It has also been observed that the thermal properties, in particular the melting point of the PA phase, may be higher than in the case of a PA12/PTMG copolymer, this being the case for the same molar mass of the PA block and of the PE block. In particular, a PEBA 6.14/PTMG copolymer with a PA6.14 block with a mass of 5000 g/mol and a PTMG block of 650 g/mol has a melting point of 196-206° C., whereas a PEBA copolymer of PA12/PTMG type with the same size of blocks has a melting point of 172° C.

Example 3

Preparation of copolymer comprising polyamide 6.14 blocks and comprising blocks resulting from polytetramethylene ether glycol: abbreviated to PA6.14-PTMG A PEBA was prepared from PA6.14 blocks with a molar mass of 5000 g/mol and from PTMG blocks with a molar mass of 650 g/mol according to the preceding procedure with, however, as diamine, 1,6-hexamethylenediamine (13.2 kg), as diacid, 1,12-dodecanedicarboxylic acid (31.6 kg), and polytetramethylene glycol (5.3 kg). The final product PA6.14-PTMG has an intrinsic viscosity of 1.44 dl/g.

The flexural modulus of the product thus obtained (after conditioning at 23° C. and 50% relative humidity for 14 days) was measured at 680 MPa, which can be compared with the flexural modulus at 380 MPa for a copolymer with the same size of PA blocks and with the same size of PE blocks respectively but based on PA12 and PTMG. Although much stiffer, the novel product does not break after 150 000 cycles during a flex fatigue test at −10° C. (Ross Flex test).

Example 4

Preparation of copolymer comprising polyamide 6.12 blocks and comprising blocks resulting from polytetramethylene ether glycol: abbreviated to PA6.12-PTMG A PEBA was prepared from PA6.12 blocks with a molar mass of 4000 g/mol and from PTMG blocks with a molar mass of 650 g/mol according to the preceding procedure with, however, as diamine, 1,6-hexamethylenediamine (13.9 kg), as diacid, dodecanedioic acid (29.8 kg), and polytetramethylene glycol (6.4 kg). The final product PA6.12-PTMG has an intrinsic viscosity of 1.38 dl/g.

The flexural modulus of the product thus obtained (after conditioning at 23° C. and 50% relative humidity for 14 days) was measured at 730 MPa, which can be compared with the flexural modulus at 380 MPa for a copolymer with a larger size of PA blocks and with the same size of PE blocks respectively but based on PA12 and PTMG. Although having a greater percentage of flexible phase than that of the product based on PA12, the product PA6.12-PTMG is significantly stiffer and does not break after 150 000 cycles during a flex fatigue test at −10° C. (Ross Flex test).

What is claimed is:

1. A process for producing a shaped article, said article comprising a block copolymer PAX.Y/PE comprising polyamide (PA) blocks alternating with polyether (PE) blocks, wherein said process comprises the steps of:
   a) preparing homopolyamide blocks PAX.Y by polycondensation of linear aliphatic diamines having X carbon atoms and dicarboxylic acids having Y carbon atoms, the dicarboxylic acids introduced in excess with respect to the stoichiometry, wherein said PAX.Y is selected from the group consisting of PA 6.18 and PA 10.14,
   b) reacting said homopolyamide blocks with polyether PE blocks in the presence of a catalyst to produce a block copolymer PAX.Y/PE, wherein said PE blocks are selected from the group consisting of:
      (i) PE blocks comprising hydroxyl ends, otherwise known as PE diol blocks, so that the bonds between the PA blocks comprising carboxyl ends and the PE diol blocks are ester bonds; and
      (ii) PE blocks comprising $NH_2$ ends in the case where Y has a number of carbon atoms of greater than 14, so that the bonds between the PA blocks comprising carboxyl ends and the PE blocks comprising $NH_2$ ends are amide bonds;
         wherein said PE blocks comprise from 0 to 39% by weight of polytrimethylene ether glycol PO3G and/or polyethylene glycol PEG and from 100 to 61% by weight of polytetramethylene glycol PTMG (% by weight, expressed with respect to the total weight of the PE blocks);

c) forming said block copolymer PAX.Y/PE into a fabric, film, sheet, rod, pipe, injection-molded component, or a shoe sole;

wherein the crystallinity of the PAX.Y block is greater than the crystallinity of a PA12 block of the same size and/or the PA/PE phase separation of said copolymer PAX.Y/PE is greater than that of a copolymer PA12/PTMG composed of PA12 blocks of the same size as the PAX.Y blocks of said copolymer PAX.Y/PE and of polytetramethylene glycol PTMG blocks of the same size as the PE blocks of the PAX.Y/PE copolymer; wherein the copolymer PAX.Y/PE has an improved flexural modulus of at least 300 MPa greater than a copolymer PA12/PTMG with the same size of PA block and with the same size of PE block respectively, after conditioning at 23° C. and 50% relative humidity for 14 days, wherein said copolymer PAX.Y/PE does not break after 150,000 cycles during a flex fatigue test at −10° C. (Ross Flex test); and wherein step a) and step b) are carried out as a single step.

2. The process as claimed in claim 1, wherein the number-average molecular weight of the PA blocks is between 500 and 10 000.

3. The process as claimed in claim 1, wherein the number-average molecular weight of the PE blocks is between 250 and 5000.

4. The process as claimed in claim 1, wherein the number-average molecular weight of said copolymer is between 5000 and 50 000.

5. The process as claimed in claim 1, wherein the PA blocks advantageously represent between 5 and 95% by weight of the sum of the PA blocks and PE blocks of said copolymer.

6. The process as claimed in claim 1, wherein said catalyst comprises a derivative of a metal chosen from the group consisting of titanium, zirconium and hafnium, phosphoric acid or boric acid.

7. The process as claimed in claim 1, wherein the polycondensation at carried out at a temperature from 180 to 300° C.

8. A process for producing a shaped article, said article comprising a block copolymer PAX.Y/PE comprising polyamide (PA) blocks alternating with polyether (PE) blocks, wherein said process comprises the steps of:

a) preparing homopolyamide blocks PAX.Y by polycondensation of linear aliphatic diamines having X carbon atoms and dicarboxylic acids having Y carbon atoms, the dicarboxylic acids introduced in excess with respect to the stoichiometry, wherein said PAX.Y is selected from the group consisting of PA6.18 and PA10.14, b) reacting said homopolyamide blocks with polyether PE blocks in the presence of a catalyst to produce a block copolymer PAX.Y/PE, wherein said PE blocks are polytetramethylene glycol PTMG, c) forming said block copolymer PAX.Y/PE into a fabric, film, sheet, rod, pipe, injection-molded component, or a shoe sole;

wherein the crystallinity of the PAX.Y block is greater than the crystallinity of a PA12 block of the same size and/or the PA/PE phase separation of said copolymer PAX.Y/PE is greater than that of a copolymer PA12/PTMG composed of PA12 blocks of the same size as the PAX.Y blocks of said copolymer PAX.Y/PE and of polytetramethylene glycol PTMG blocks of the same size as the PE blocks of the PAX.Y/PE copolymer; wherein the copolymer PAX.Y/PE has an improved flexural modulus of at least 300 MPa greater than a copolymer PA12/PTMG with the same size of PA block and with the same size of PE block respectively, after conditioning at 23° C. and 50% relative humidity for 14 days, wherein said copolymer PAX.Y/PE does not break after 150,000 cycles during a flex fatigue test at −10° C. (Ross Flex test); and wherein step a) and step b) are carried out as a single step.

* * * * *